United States Patent [19]

Touma

[11] Patent Number: 5,103,242
[45] Date of Patent: Apr. 7, 1992

[54] VIDEO PRINTER CAPABLE OF POSTPROCESSING A PRINT AND METHOD OF POSTPROCESSING USING THE SAME

[75] Inventor: Takashi Touma, Tokyo, Japan

[73] Assignee: Fuji Photo Film Co., Ltd., Kanagawa, Japan

[21] Appl. No.: 488,827

[22] Filed: Mar. 6, 1990

[30] Foreign Application Priority Data

Mar. 24, 1989 [JP] Japan ................................ 1-70700

[51] Int. Cl.$^5$ .......................... G01D 9/00; B41M 5/34; B41M 5/26; B41J 2/325
[52] U.S. Cl. ................................ 346/1.1; 346/76 PH; 400/120
[58] Field of Search ................. 346/76 PH, 1.1; 400/120

[56] References Cited

U.S. PATENT DOCUMENTS

| | | | |
|---|---|---|---|
| 4,621,271 | 11/1986 | Brownstein | 346/76 PH |
| 4,666,320 | 5/1987 | Kobayashi et al. | 346/76 PH |
| 4,716,145 | 12/1987 | Vanier et al. | 503/227 |

Primary Examiner—Benjamin R. Fuller
Assistant Examiner—Huan Tran
Attorney, Agent, or Firm—Sughrue, Mion, Zinn, Macpeak & Seas

[57] ABSTRACT

A print is postprocessed by using a thermal transfer type of video printer in which an array of heater elements is heated in response to a video signal representing an image to transfer a dye from a dye sheet onto an image-receiving medium to record the image on the medium. A flat postprocessing sheet is prepared which has a primary surface worked to form a desired postprocessing surface contour thereon. The medium on which the dye is transferred is set in the video printer with the primary surface of the postprocessing sheet being brought into contact with the surface of the medium onto which the dye is transferred. The video printer is enabled to press the set postprocessing sheet together with the medium carried thereon via the dye sheet onto the medium by the heater array. The heater array is heated to a predetermined temperature to achieve a postprocessing on the medium. The predetermined temperature exceeds a softening point of a material of an image-receiving layer of the medium. The postprocessing sheet includes a material having a softening point higher than the predetermined temperature.

23 Claims, 4 Drawing Sheets

VIDEO PRINTER CAPABLE OF POSTPROCESSING A PRINT AND METHOD OF POSTPROCESSING USING THE SAME

BACKGROUND OF THE INVENTION

1. Field of the Invention

The present invention relates to a video printer, and more particularly to a video printer for recording an image on an image-receiving medium and thereafter achieving postprocessing on a surface of the medium, and also to a postprocessing method implemented by the video printer.

2. Description of the Prior Art

For example, in a thermal printer, a dye developing thermally diffusing and transferring characteristics is heated by means of a thermal print head so as to be transferred onto a transfer medium such as paper, thereby recording visible information thereon. The dye is applied on a ribbon or a sheet with a binder. With the dyed surface of the ribbon or sheet brought into contact with the transfer medium, or image-receiving medium, the opposite surface thereof is heated by the thermal print head. The head includes an array of heater elements in which many heating elements are arranged in a line. The heater elements heat portions of the dye on the ribbon or sheet in association with information items to be recorded on the medium. As a result, portions of the dye in the heated locations of the ribbon or sheet are diffused so as to be transferred onto the transfer medium. This type of thermal printer is efficiently applied to a video printer, for example.

In the thermal printer, when the dye is passed from the ribbon or sheet onto the transfer medium, the dye does not completely penetrate into materials constituting the medium. More specifically, the dye accumulates thereon to form a layer on the transfer surface. This consequently lowers the stability of the information recorded on the medium. Moreover, the dye accumulated on the surface develops a metallic luster, which reduces quality of the visibility of the printed image. In addition, since the accumulated portion of the dye is not satisfactorily fixed onto the medium, the dye may often be transferred further therefrom to the surface of another article that is brought into contact with the surface.

Heretofore, as for postprocessing to be accomplished after the dye transfer to increase the durability of the dye layer on an image-receiving medium, an apparatus has been proposed in a co-pending Japanese patent application No. 223560/1988 filed by the same applicant as that of the present application. With the apparatus disclosed in the prior Japanese application, the image-receiving medium is transferred through a gap between a couple of heater rollers rotating with respective opposing surfaces thereof being brought into contact with each other so as to produce a smooth surface on the medium. In the prior art, when paper is used as the recording medium, a satisfactory smooth surface can be expectedly produced on the surface. However, due to a considerably strong heating energy produced, when synthetic paper is adopted as the medium, wrinkles may be formed on a surface opposite to the smoothed front surface. This apparatus has not been suitably incorporated into a hardcopying apparatus such as a video printer for the following reason. The adoption of such prior art apparatus leads to a disadvantage that the size and power consumption of the overall system are increased.

Another co-pending Japanese patent application filed by the same applicant as that of the present application, Nos. 228481/1988 and 228482/1988 have disclosed video printers in which an image-receiving medium already carrying an image recorded is processed to develop luster. In the former application, a dye sheet is used which has a blank area disposed to attain luster on a surface of the image-receiving medium. In the latter, in place of the dye sheet, a lusterring sheet is used to develop luster on the medium surface. In both of the conventional video printers, the postprocessing is limitatively used to obtain the luster. More specifically, the postprocessing cannot be adopted to produce other surfaces such as mat and silky surfaces. In addition, a dye sheet or a postprocessing sheet having a constitution dedicated to the postprocessing has been necessary. Particularly, in a process to eject the image-receiving medium after postprocessing, when the blank area of the dye sheet or the postprocessing sheet tightly fixed on the surface of the medium is peeled off therefrom, it is likely that the surface of the image-receiving medium may be disadvantageously rubbed, thereby forming flaws or defects thereon. In consequence, a high quality cannot be attained for the image recording.

SUMMARY OF THE INVENTION

It is therefore an object of the present invention to provide a video printer and a postprocessing method thereof in which, after an image is recorded on an image-receiving medium, a high-quality postprocessing can be easily carried out with variously available surface conditions, thereby solving the problems encountered with the prior art.

A video printer in accordance with the present invention comprises: drive means having an array of heater elements for receiving a video signal representing an image and driving the array of heater elements in response to the video signal; retaining means for retaining an image-receiving medium opposing to the array of heater elements; feeder means for feeding a dye sheet carrying a thermally transferable dye between the array of heater elements and the image-receiving medium retained by said retaining means; and control means for controlling said drive means, retaining means and feeder means, and enabling said drive means in response to the video signal to heat the array of heater elements, thereby transferring the dye from the dye sheet onto a surface of the image-receiving medium to record the image on the image-receiving medium. Said control means controls said retaining means to retain a flat postprocessing sheet having a primary surface on which a postprocessing surface contour is formed, with the surface of the image-receiving medium on which the dye is transferred in contact with the primary surface of the postprocessing sheet. Said control means is adapted to control said drive means to press the postprocessing sheet via the dye sheet onto said retaining means and to heat the array of heater elements to a predetermined temperature to thereby achieve a postprocessing on the image-receiving medium, the predetermined temperature exceeding a softening point of a material of an image-receiving layer of the image-receiving medium, the postprocessing sheet including a material having a softening point which is higher than the predetermined temperature.

A method of postprocessing a print using a video printer in accordance with the present invention, comprises the steps of: preparing a video printer in which an array of heater elements is heated in response to a video signal representing an image to transfer a dye from a dye sheet onto an image-receiving medium to record the image on the image-receiving medium; preparing a flat postprocessing sheet which has a primary surface on which a postprocessing surface contour is formed; setting the image-receiving medium on which the dye is transferred in the video printer with the primary surface of the postprocessing sheet brought into contact with the surface of the image-receiving medium on which the dye is transferred; enabling the video printer to press the set postprocessing sheet together with the image-receiving medium carried thereon via the dye sheet against the image-receiving medium by the array of heater elements; and heating the array of heater elements to a predetermined temperature to achieve a postprocessing on the image-receiving medium, the predetermined temperature exceeding a softening point of a material of an image-receiving layer of the image-receiving medium, the postprocessing sheet including a material having a softening point which is higher than the predetermined temperature.

Further in summary, a print is postprocessed in accordance with the present invention in which a thermal transfer type of video printer is used which includes an array of heater elements that is heated in response to a video signal representing an image to transfer a dye from a dye sheet onto an image-receiving medium to record the image on the medium. A flat postprocessing sheet is prepared which has a primary surface worked to form a desired postprocessing surface contour thereon. The medium on which the dye is transferred is set in the video printer with the primary surface of the postprocessing sheet being brought into contact with the surface of the medium onto which the dye is transferred. The video printer is enabled to press the set postprocessing sheet together with the medium carried thereon via the dye sheet onto the medium by the heater array. The heater array is heated to a predetermined temperature to achieve a postprocessing on the medium. The predetermined temperature exceeds a softening point of a material of an image-receiving layer of the medium. The postprocessing sheet includes a material having a softening point higher than the predetermined temperature.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Referring now to the drawings, a description will be given in detail on an embodiment in which the present invention is applied to a thermal dye-transfer type of color video printer.

Figure 1:
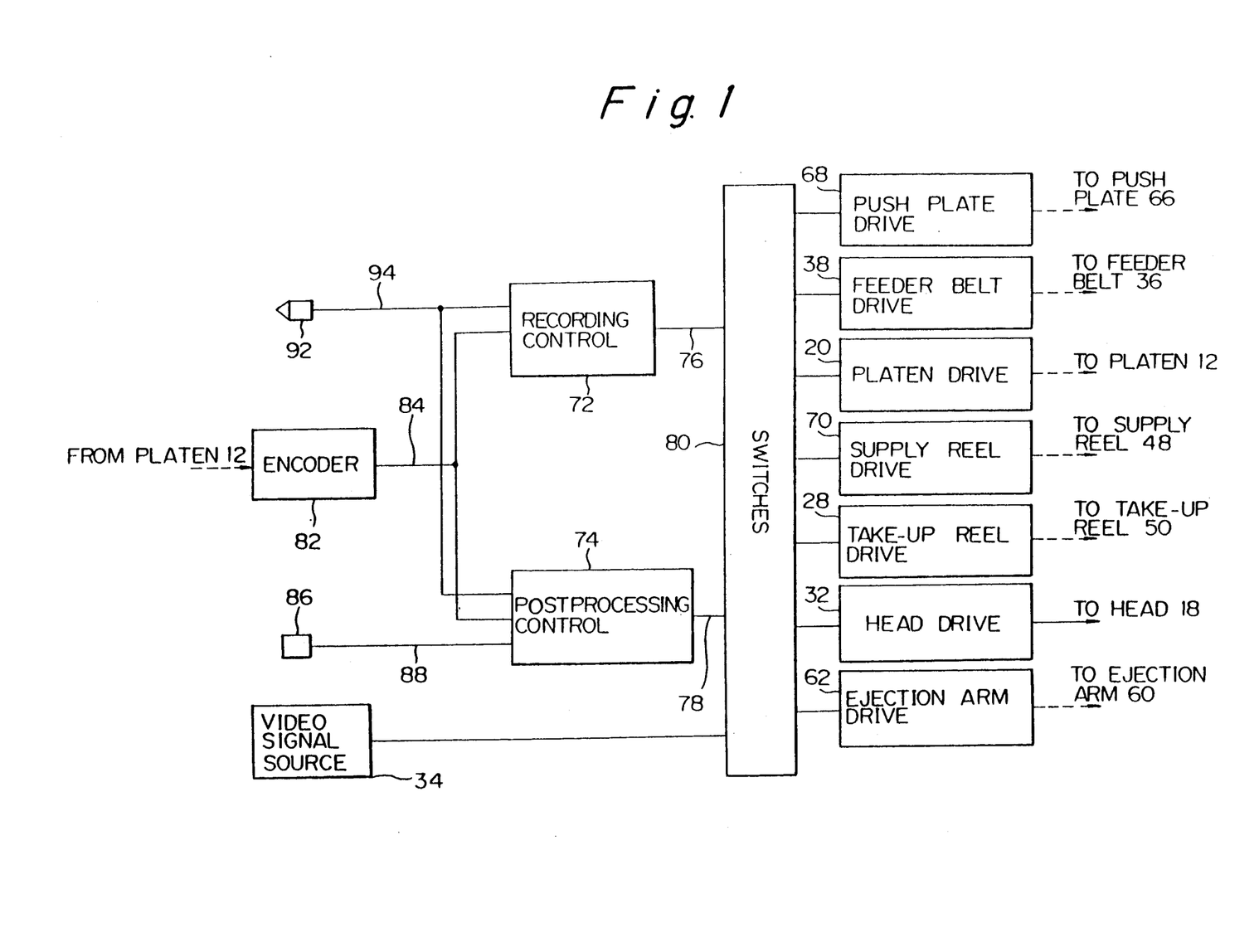
FIG. 1 is a functional block diagram schematically showing an embodiment of a color video printer in accordance with the present invention.
Figure 2:
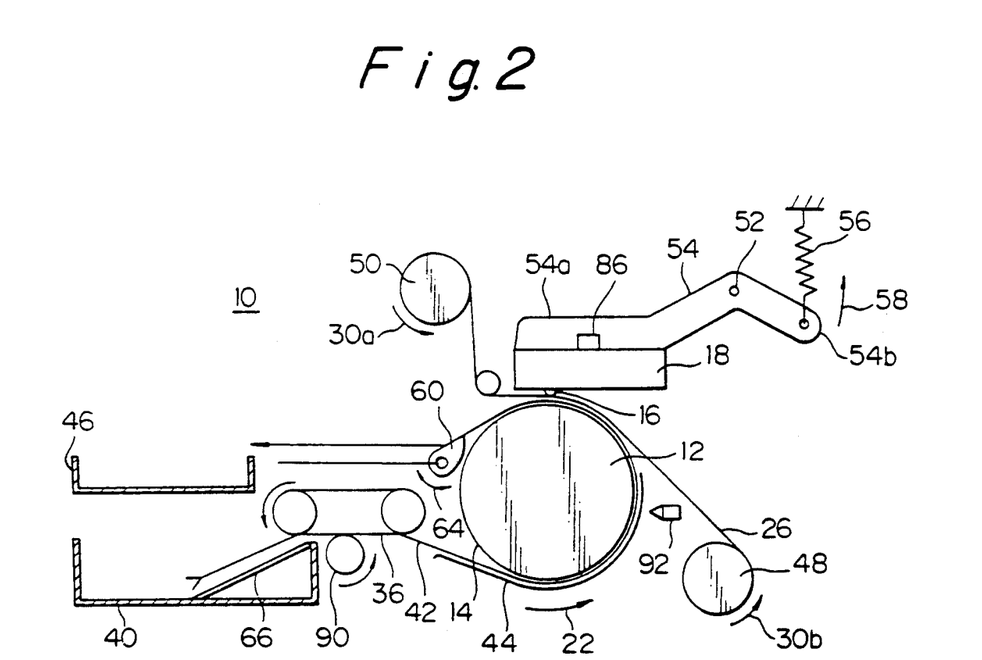
FIG. 2 is a schematic side view illustratively showing the configuration of an image recorder mechanism of the embodiment shown in FIG. 1.
Figure 4:
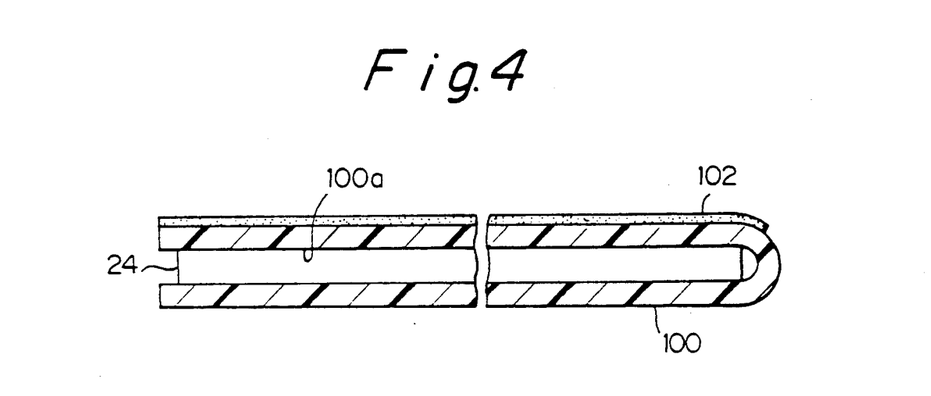
FIGS. 4 and 5 are cross-sectional views schematically showing examples of postprocessing sheets employed in the embodiment.

Referring to FIGS. 1 and 2, in the color video printer of this embodiment, a color image represented by a color video signal supplied from a video signal source 34 is recorded on an image-receiving medium 24, FIG. 4, by means of a recorder section 10. This section 10 is an image recording mechanism of the thermal transfer type described above. In the section 10, a sheet 26 coated with a dye developing a thermal diffusion is heated by a thermal print head 18 while being pressed against a transfer medium 24 such as paper. As a result, part of the dye thus heated is diffused and is transferred onto an image-receiving layer of the medium 24 so as to record visible information thereon.

The recording mechanism 10 of the printer is basically configured as follows. In order for an array of heater element 16 to be slidably brought into contact with a cylindrical surface 14 of a platen drum 12, the thermal print head 18 is arranged to be parallel to a generatrix of the drum 12. The platen drum 12 is mechanically linked with a platen driver 20 so as to be driven into a rotation in a direction denoted by an arrow 22. The circumferential surface 14 develops a function to carry thereon the image-receiving medium 24. The drum 12 has a rotational speed or phase which is in turn encoded by an encoder 82 linked with the drum 12. The encoder 82 has an output 84 supplying the encoded, resultant signal in the form of a rotary pulse signal to a recording control 72 and a postprocessing control 74, which will be described later.

The dye sheet is inserted between the medium 24 and the array 16 as shown in FIG. 2. The dye sheet 26 is supported between a supply reel 48 and a take-up reel 50. In an image recording mode, the sheet 26 is fed in a direction indicated by arrows 30a and 30b by means of a take-up reel drive 28 in time with a rotation of the platen drum 12. In this operation, a head drive circuit 32 drives the array of heater elements 16 in response to color component signals supplied from the image signal source 34 such as a memory card loaded with image data, thereby recording an image represented by the signals on the medium 24. In this embodiment, the supply reel 48 for the dye sheet 26 is linked with a reel driver 70. Consequently, the dye sheet 26 may be reversely moved in a direction opposite to the direction indicated by the arrow 30b.

The print head 18 includes an array 16 constituted with many resistive heater elements arranged in a column corresponding to a print line forming an image to be recorded. A recording density is controlled in such a fashion that the number and duration of pulses applied to the respective heater elements of the array 16 are adjusted so as to control a temperature and a heating period of time thereof by means of the head drive 32. The head 18 is carried on a free end 54a of an arm 54 supported to be rotatable about a fulcrum 52. Other free end 54b of the arm 54 is linked to a body of the apparatus by use of a spring 56. The spring 56 is energized by a spring force in the direction of an arrow 58. As a result, the head 18 is pushed against the platen 12. In a portion of the head 18, as can be seen from FIG. 2, disposed is a temperature sensor 86 such as a temperature measuring resistive device (thermistor) or a thermocouple. The sensor 86 produces a temperature signal representative of a temperature to be developed by the array of heater elements 18 so as to deliver the signal from an output 88 to the postprocessing control 74.

The head drive circuit 32, which controls the heating operation of the array 16 as mentioned above, is also mechanically linked with the head 18 so as to constitute a recording mechanism. The mechanism controls operations to energize and deenergize the depression exerted from the push spring 56 onto the platen surface 14.

This apparatus includes the recording and postprocessing controls 72 and 74, respectively. The apparatus operates in two modes including an image recording and a postprocessing mode. The recording control 72 controls operations to record an image on the image-receiving medium 24. The postprocessing control 74 supervises operations to conduct a postprocessing on a surface of the medium 24 after recorded. As shown in FIG. 1, the recording and postprocessing controls 72 and 74 respectively have control lines 76 and 78, which are interconnected to switches 80. The switches 80 are a selective connector circuit responsive to the image recording and postprocessing modes to operatively connect the control lines 76 and 78 to drive circuits 62, 32, 28, 70, 20, 38, and 68. In this embodiment, two controllers 72 and 74 are selectively connected to the units 62. 32, 28, 70, 20, 38, and 68 by means of the switch circuit 80 so as to allow the constituent components primarily used for image recording to effectively be used for postprocessing also. This prevents the size of the apparatus from being increased and the constitution thereof from being complicated.

The image-receiving medium 24 includes a sheet of synthetic paper as a base and an image-receiving layer formed by a synthetic resin material such as a polyester resin applied thereon with a thickness of about 5 to 6 microns. As the medium 24, a cut sheet of a visiting card size is employed, for example. For a transparent image-receiving medium, similarly, a transparent base is used so as to be coated with a polyester material.

The medium 24 is housed in a sheet tray 40. When the tray 40 is pushed by a push plate 66 such that when an end of the tray 40 is slidably brought into contact with a feeder belt 36, the medium 24 is caught by the belt 36. The push plate 66 is controlled by a push plate drive 68 so as to move upward and downward. The medium 24 is supplied by means of the feeder belt 36 and a feeder belt drive 38 of the recorder mechanism 10 from the sheet tray 40 to the palten drum 12. As shown in FIG. 2, on the feeder belt 36 arranged is a roller 90, which prevents two or more sheets of image-receiving medium 24 from being supplied from the sheet tray 40 onto the circumferential surface 14 of the drum 12.

The image-receiving medium 24 is delivered from the feeder belt 36 while being guided by a supply guide 44, as indicated by a transfer route 42, over the circumferential surface 14 to a sheet ejection tray 46. In the neighborhood of the circumferential surface 14 of the drum 12, a medium sensor 92 is arranged as shown in the figure. The sensor 92 produces a medium sense signal in response to an arrival of the medium 24 at a predetermined position on the circumferential surface 14 of the drum 12. The produced signal is fed via an output 94, which is connected to the controllers 72 and 74. In a position from the circumferential surface 14 of the drum 12 to an ejection route, as shown in the figure, an ejection 60 arm is disposed. The arm 60 is driven by an ejection arm drive 62 so as to be rotated in the direction denoted by an arrow 64, thereby controlling ejection of the image-receiving medium 24.

In the image recoring mode, the recording control 72 efficiently functions. The record control 72 is connected via the switches 80 to the respective elements 62, 32, 28, 70, 20, 38, and 68. The image signal source 34 is linked via the switches 80 with an input of the head drive 32. In this situation, the head drive 32 is supplied from the signal source 34 with serial pulses associated with an image signal. The pulses are converted into parallel driver currents associated with the respective heater elements of the array 16 so as to drive the heater elements.

The recording control 72 controls the push plate driver 68 to move the push plate 66 upward, and also the feeder belt drive 38 to run the feeder belt 36. The medium 24 is resultantly delivered from the sheet tray 40 onto the circumferential surface 14 of the drum 12. Owing to the function of the roller 90, only one sheet of medium 24 is supplied. The record control 72 further controls the platen drive 20 to rotate the platen drum 12 at a predetermined speed in the direction of the arrow 22. In timed therewith, the take-up reel drive 28 is controlled to rotate the take-up reel 50 in the direction of the arrow 30a. In this operation, the ejection arm 60 is moved by the ejection arm drive 62 so as to be located at a position as shown in FIG. 2. In consequence, respective areas of the dye sheet 26, such as of yellow, magenta, and cyan areas, are sequentially fed onto the surface 14. Resultantly, the same medium 24 is repeatedly supplied thereto three times by the drum 12.

The recording control 72 controls the head drive 32, when an arrival of the medium 24 at a predetermined position of the drum surface 14 is sensed by means of the medium sensor 92, to push the head 18 via the dye sheet 26 onto the surface 14. The input of the head drive 32 is supplied with color component signals representing an image of a frame to be recorded. In this example, the yellow, magenta, and cyan component signals are supplied in this order. The head drive 32 energizes in response to the color component signals the respective heater elements of the array 16. As stated above, while the platen drum 12, the image-receiving medium 24, and the dye sheet 26 are moving in a united fashion, the array 16 pushes the dye sheet 26 onto the medium 24 to record images represented by the component signals of the yellow, magenta, and cyan onto a single frame of the medium 24, thereby completely reproducing a color image.

When the color image is produced, the recording control 72 enables the ejection arm drive 62 to turn the ejection arm 60 so as to deliver the medium 24 toward the ejection tray 46. As a result, the medium 24 on which the image is recorded is ejected onto the tray 46.

In this embodiment, the image-receiving medium 24 on which the image is recorded undergoes a postprocessing to form desired surface conditions thereon such as a surface with luster, a mat surface, or a silky surface. For this purpose, a postprocessing or carrier sheet 100, FIG. 4, is prepared. The postprocessing sheet 100 is a flat sheet made of a material such as a polyimid, having a heat-resistive temperature point exceeding a softening point of the material of the image-receiving layer of the medium 24. In the example shown in FIG. 4, the sheet 100 is two or more times as large as the image-receiving medium 24. In use, the sheet 100 is bent or folded to insert the medium between the bent portions. An outer one of the primary surfaces of the sheet 100, at least a portion associated with the image-receiving medium 24 is advantageously provided with a layer of peeling agent 102. This peeling layer 102 functions as facilitating the postprocessing sheet 100 to be removed from the dye sheet 26.

Figure 6A:
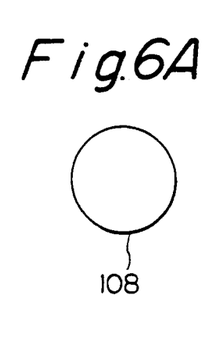
FIGS. 6A, 6B, and 6C exemplify examples of the surface conditions applicable to the postprocessing sheets shown in FIGS. 4 and 5.
Figure 6B:
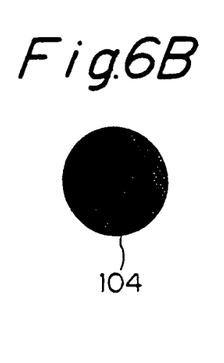
Figure 6C:
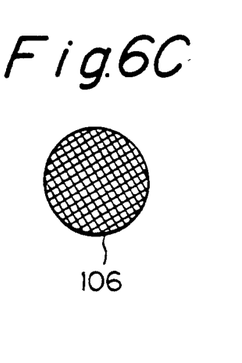

A portion of the other principal surface, or inner one of the primary surfaces of the sheet 100, namely, a portion 100a at least substantially associated with an image recording area of the image-receiving medium 24 inserted in the folded portions of the sheet 100 as shown in the figure, is provided with a postprocessing surface contour or conditions worked therein. As the contour formed in the portion 100a, such as a mat surface contour 104, FIG. 6B, or a silky surface contour 106, FIG. 6C, is advantageously employed. Into either one of these surface contours 104 and 106, embossed is the portion 100a of the inner surface of the postprocessing sheet 100. By using the sheet 100 as will be described later, the postprocessing can be accomplished to form a desired surface such as a mat or silky surface. Alternatively, by conducting a mirror finishing 108 on the portion 100a as shown in FIG. 6A, the postprocessing can be carried out to form a surface with luster. For the surface 108 with luster, a surface of the base material of the postprocessing sheet 100 or 110 may be used, for example. Or alternatively, an appropriate material may be applied thereon to obtain luster of a mirror surface. For example, a gellatin polymer or cellulose polymer may be employed for this purpose.

Figure 5:
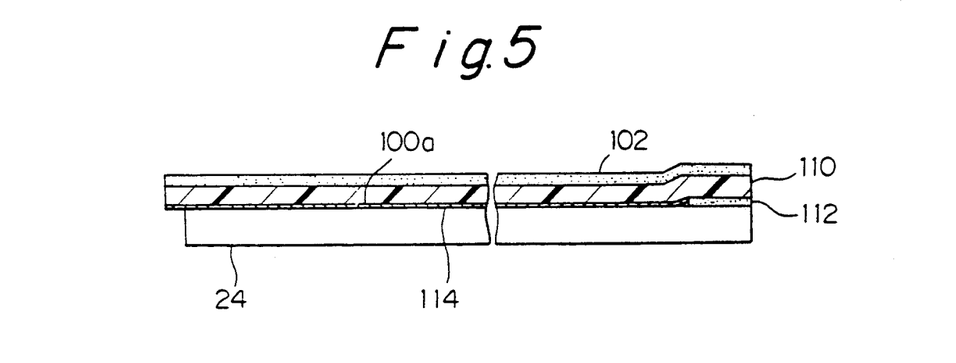

FIG. 5 shows an example of a postprocessing sheet 110 with a surface contour formed thereon. The contour is substantially identical to that of the image-receiving medium 24. The sheet 110 is provided with a layer 112 at one end thereof. The layer 112 is formed with a removable adhesive agent in a strip shape. The layer 112 has a principal surface 100a provided with a layer 114 formed thereon with an electrification preventive material. This layer 114 is disposed such that in postprocessing steps, which will be described later, the postprocessing sheet 110 is easily removed from the image-receiving medium 24 and that adhesion of foreign objects due to static electricity is prevented. This enables reuse of the sheet 110. Naturally, a similar electrification preventive processing may be employed also in the embodiment shown in FIG. 4.

For the postprocessing sheet 100 or 110, in addition to polyimid mentioned above, a material having a relatively lower heat-resistive temperature point such as PET may be adopted. The sheet 100 or 110 made of such a material may disposably be used without causing any financial problem. In this case, consequently, the electrification preventive layer 112 need not be formed. Moreover, the sheet 100 or 110 is rather tightly fixed onto the image-receiving medium 24, which results in a higher-quality postprocessing. The postprocessing sheets 100 and 110 may be of a thickness from about 7.5 to about 150 microns. In practice, the thickness is from about 12.5 to about 75 microns. Most suitably, the thickness ranges from about 25 to about 50 microns.

Figure 3:
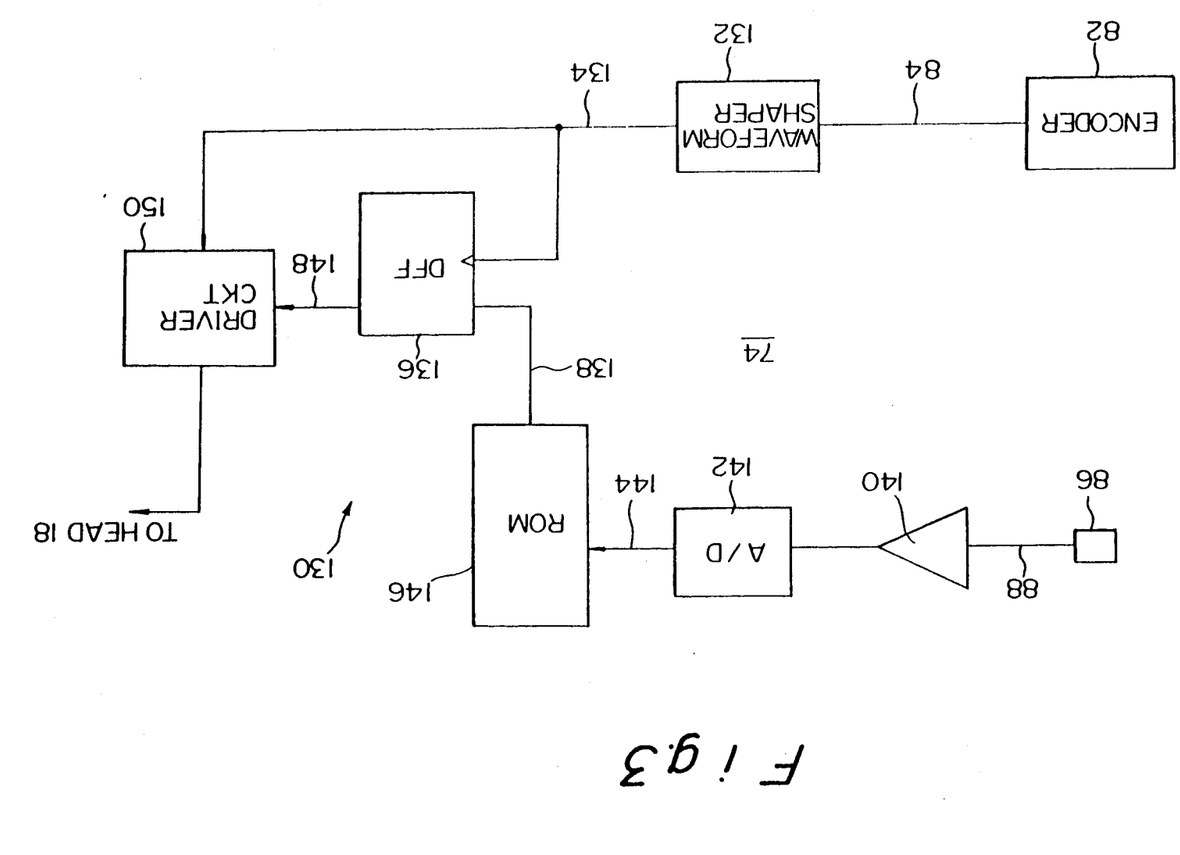
FIG. 3 is a functional block diagram showing a circuit example of a drive for an array of heater elements included in a postprocessing control of the embodiment.

The post processing step of this apparatus is controlled by the postprocessing control 74. The control 74 includes as a portion thereof a circuit 130 for controlling a temperature of a heater element as shown in FIG. 3. This heater temperature control circuit 130 produces in the postprocessing mode a signal representative of a pattern of power conduction, in accordance with which power is fed to the array of heater elements 16. The pattern is slightly different from one used when recording images. The array 16 is driven at a timing generated as described below. The encoder 82 for the platen drum 12 creates an output, which is fed to a waveform shaper circuit 132. At a positive-going or negative-going edge of a rotation pulse 134 coming from the encoder 82 and shaped in waveform by the waveform shaper 132, a D-type flip-flop, DFF, 136 is clocked to thereby establish the timing at which the array of heater elements 16 is driven. Since the encoder 82 generates a rotation pulse synchronized with the rotation of the platen drum 12, the heater element array 16 is driven in time with the rotation of the platen drum 12. The duty ratio thereof depends on data supplied to a set input 138 of the flip-flop 136.

The data determining the duty ratio of the flip-flop 136 is associated with temperature data 144, which is obtained in a manner described below. The temperature sensor 86 for the head 18 produces a temperature sense output 88 to be amplified by an amplifier 140. The amplified signal is then provided to an analog-to-digital, A/D, converter 142, thereby being produced as the temperature data 144. The data 144 is fed to an ROM 146 as an address designating a storage location of the ROM 146. The ROM 146 is beforehand loaded with drive data such that, for a lower temperature of the array 16, the pulse duration or voltage of the drive pulse for the array 16 is increased whereas, for a higher temperature, the pulse duration or voltage is decreased. In other words, the drive data is loaded so that, in the postprocessing mode, the heating temperature developed by the heater element array 16 exceeds the softening point of the material of the image-receiving layer of the medium 24. The drive data is read out from an output 138 of the ROM 146 to the flip-flop 136. The flip-flop 136 has an output 148 connected to a heater element drive 150. The latter drive 150 supplies power to the array 16 in response to the output 148.

As described above, when the postprocessing is to be carried out on the image-receiving medium 24 on which an image is thus recorded, the medium 24 is first retained by use of the postprocessing sheet 100 or 110 so as to be set in the sheet tray 40. In this case, the postprocessing sheet 100 or 110 has the desired surface contour 108, 104, or 106. The surface having contour 100a thus worked on the sheet 100 or 110 is brought into contact with the overall image-receiving surface in which the image is recorded in the medium 24. When the postprocessing sheet 100 is used, as shown in FIG. 4, the medium 24 is covered with the folded sheet 100. In a case of the sheet 110, as shown in FIG. 5, the sheet is fixed onto an edge portion of the medium by use of the adhesive agent 112 so as to be settled in the sheet tray 40 with the recording surface facing upward in FIG. 2.

The switches 80 are set to the postprocessing mode positions thereof, and thereafter postprocessing instructions are supplied to the postprocessing control 74. As a result, the respective units 62, 32, 28, 20, 70, 38, and 68 are linked via the switches 80 with the control 74. In response thereto, the control 74 orders the take-up reel drive 28 to release the take-up reel 50 to a free state. In addition, the supply reel drive 70 is also controlled to rotate the supply reel 48 in the direction opposite to one indicated by the arrow 30b. This results in a reverse movement of the dye sheet 26. The dye sheet 26 need only be reversely delivered at least by a length substantially equal to a length of the image-receiving medium 24 in the running direction for the following reason. Namely, when the postprocessing is conducted by use of the dye sheet, which will be described later, the dye sheet 24 employed in this processing need not contribute to the dye transfer at all. In consequence, a portion already used of the dye sheet 26 is advantageously adopted in the processing mentioned above.

After the reverse movement is completed, the postprocessing control 74 enables the platen drive 20 to start driving the platen drum 12, and controls the push plate drive 68 to move the push plate 66 upward. Resultantly, the postprocessing sheet 100 or 110 carrying the image-receiving medium 24 thereon is caught by the feeder belt 36. Only the postprocessing sheet 100 or 110 carrying the image-receiving medium 24 thereon passes the double-sheet feeding preventing roller 90 up to the paper feed guide 44. The sheet 100 or 110 is loaded onto the circumferential surface 14 owing to the rotation of the drum 12 so as to be conveyed through the transfer route 42.

When an arrival of the sheet 100 or 110 at the predetermined position is sensed by the medium sensor 92, the postprocessing control 74 controls the head drive 32 to push the head 18 via the dye sheet 26 onto the surface 14. Furthermore, the supply reel drive 70 is controlled to set the supply reel 48 to its free state. The take-up reel drive 28 is also controlled to rotate the take-up reel 50 in the direction designated by the arrow 30a. Resultantly, the dye sheet 26 runs at a linear speed equivalent to the circumferential rate of the surface 14 of the platen drum 12. While being kept pushed onto the circumferential surface 14 by the dye sheet 26, the medium 24 thus carried on the postprocessing sheet 100 or 110 is retained on the surface 14.

The postprocessing control 74 monitors the output 84 from the encoder 82 to energize the heater element drive 150 at a timing when a top end portion in the running direction of the medium 24 reaches the heater element array 16 so as to start supplying power to the array 16. Powering the array 16 at this time causes a necessary heating temperature to be developed when the array 16 relatively passes the end portion of the medium 24 to arrive at a location where an image is actually recorded. Through the heating operation, the image-receiving layer of the medium 24 is heated up to a temperature exceeding the softening point of the material of that layer. Consequently, the image-receiving layer is softened. This will result in forming the contour 108, 104, or 106 in the worked surface 100a of the sheet 100 or 110 onto the surface of the image-receiving layer. The dye transferred onto the surface of the image-receiving layer is penetrated and diffused into the base material so as to be fixed therein.

The image-receiving medium 24 which has thus undergone the postprocessing is, while being kept carried on the postprocessing sheet 100 or 110, delivered into the ejection tray 46 in the same fashion as for the image recording operation. Since the image-receiving surface of the medium 24 is covered with the sheet 100 or 110, even if members such as an ejection guide arranged in the ejection path were brought into contact therewith, the surface would not be damaged. The sheet 100 or 110 can be easily removed, owing to the peeling agent, from the dye sheet 26 in the ejecting step. In the image-receiving medium 24 thus postprocessed, the image formed with the transferred dye possesses a higher durability, and a surface with luster, a mat surface, or a silky surface is satisfactorily developed.

In accordance with the present invention, the image-receiving layer having undergone a recording and carried on the postprocessing sheet is pushed while being heated by the thermal print head, thereby achieving a desired postprocessing on the image receiving layer. Consequently, the postprocessing does not cause any damage on the image-receiving surface. Moreover, any apparatus other than the video printer is not required for postprocessing, which prevents the video printer from being increased in size. Through a simple operation, the postprocessing can be achieved on the image-receiving medium after an image is recorded thereon. The image-receiving medium thus postprocessed develops a higher durability and a satisfactory surface postprocessed.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A video printer comprising:
   drive means having an array of heater elements for receiving a video signal representing an image and driving the array of heater elements in response to the video signal;
   retaining means for retaining an image-receiving medium opposing to the array of heater elements;
   feeder means for feeding a dye sheet carrying a thermally transferable dye between the array of heater elements and the image-receiving medium retained by said retaining means; and
   control means for controlling said drive means, retaining means and feeder means, and enabling said drive means in response to the video signal to heat the array of heater elements, thereby transferring the dye from the dye sheet onto a surface of the image-receiving medium to record the image on the image-receiving medium;
   said control means controlling said retaining means to retain a flat postprocessing sheet having a primary surface on which a postprocessing surface contour is formed, with the surface of the image-receiving medium on which the dye is transferred in contact with the primary surface of the postprocessing sheet;
   said control means controlling said drive means to press the postprocessing sheet via the dye sheet onto said retaining means and to heat the array of heater elements to a predetermined temperature to thereby achieve a postprocessing on the image-receiving medium, the predetermined temperature exceeding a softening point of a material of an image-receiving layer of the image-receiving medium, the postprocessing sheet including a material having a softening point which is higher than the predetermined temperature.

2. A video printer in accordance with claim 1, wherein said control means comprises:
   a first control circuit for controlling said drive means, retaining means and feeder means to record the image on the image-receiving medium;

a second control circuit for controlling said drive means, retaining means and feeder means to achieve the postprocessing; and selector means for selectively connecting said first and second control circuits to said drive means, retaining means and feeder means.

3. A video printer in accordance with claim 1, wherein the postprocessing sheet is formed of a generally rectangular sheet of synthetic resin having a softening point which is higher than the predetermined temperature, the sheet of synthetic resin having a primary surface on which the postprocessing surface contour is formed, said sheet of synthetic resin being retained by said retaining means with the primary surface in contact with the surface of the image-receiving medium on which the dye is transferred.

4. A video printer in accordance with claim 3, herein the sheet of synthetic resin is formed into a size which is at least twice that of the image-receiving medium and is adapted to be folded, said sheet of synthetic resin being retained by said retaining means in a folded form such that a resultant part of the sheet of synthetic resin in said folded form covers substantially the image-receiving medium with the primary surface inside and in contact with the surface of the image-receiving medium onto which the dye is transferred.

5. A video printer in accordance with claim 4, wherein the postprocessing sheet comprises a layer of material applied to a surface of the sheet of synthetic resin retained by said retaining means and which facilitates peeling of the postprocessing sheet from said retaining means after postprocessing.

6. A video printer in accordance with claim 3, wherein the sheet of synthetic resin is formed into a size which is at least as much as a size of the image-receiving medium, said sheet of synthetic resin being retained by said retaining means so that the sheet of synthetic resin covers substantially the image-receiving medium with the primary surface inside and in contact with the surface of the image-receiving medium on which the dye is transferred.

7. A video printer in accordance with claim 6, wherein the postprocessing sheet comprises a layer of material applied to a surface of the sheet of synthetic resin retained by said retaining means and which facilitates the postprocessing sheet to be peeled off from said retaining means after postprocessing.

8. A video printer in accordance with claim 6, wherein the postprocessing sheet comprises a layer of material applied to the primary surface of the sheet of synthetic resin opposing the image-receiving medium and which prevents the postprocessing sheet from sticking on the image-receiving medium by electrification therebetween.

9. A video printer in accordance with claim 6, wherein the postprocessing sheet comprises a layer of material which is applied to part of the primary surface of the sheet of synthetic resin opposing the image-receiving medium and which retains the image-receiving medium on the postporcessing sheet during postprocessing.

10. A video printer in accordance with claim 1, wherein the postprocessing surface contour comprises one selected from a group consisting of a mirror surface, a matte surface and a silky surface.

11. A video printer according to claim 1, wherein said feeder means further comprises means for feeding said dye sheet in a first direction while recording the image on the image-receiving medium and in a second direction opposite said first direction so as to position a used portion of said dye sheet adjacent said postprocessing sheet in response to said control means.

12. A method of postprocessing a print using a video printer comprising the steps of:

preparing a video printer in which an array of heater elements is heated in response to a video signal representing an image to transfer a dye from a dye sheet onto an image-receiving medium to record the image on the image-receiving medium;

preparing a flat postprocessing sheet which has a primary surface on which a postprocessing surface contour is formed;

setting the image-receiving medium on which the dye is transferred in the video printer with the primary surface of the postprocessing sheet brought into contact with a surface of the image-receiving medium on which the dye is transferred;

enabling the video printer to press the set postprocessing sheet together with the image-receiving medium carried thereon via the dye sheet against the image-receiving medium by the array of heater elements; and heating the array of heater elements to a predetermined temperature to achieve a postprocessing on the image-receiving medium, the predetermined temperature exceeding a softening point of a material of an image-receiving layer of the image-receiving medium, the postprocessing sheet including a material having a softening point which is higher than the predetermined temperature.

13. A method in accordance with claim 12, wherein the postprocessing sheet comprises a sheet of synthetic resin formed into a size which is at least twice as much as a size of the image-receiving medium, further comprising, prior to the step of setting the image-receiving medium in the video printer, the step of folding the sheet of synthetic resin so that a resultant part of the sheet of synthetic resin from folding covers substantially the image-receiving medium with the primary surface inside and in contact with the surface of the image-receiving medium on which the dye is transferred.

14. A method in accordance with claim 12, wherein the postprocessing sheet comprises a sheet of synthetic resin formed into a size which is at least as much as a size of the image-receiving medium, further comprising, prior to the step of setting the image-receiving medium in the video printer, the step of covering substantially the image-receiving medium with the sheet of synthetic resin with the primary surface inside and in contact with the surface of the image-receiving medium on which the dye is transferred.

15. A method in accordance with claim 12, wherein the postprocessing surface contour comprises one selected from a group consisting of a mirror surface, a matte surface and a silky surface.

16. The method in accordance with claim 11, wherein said enabling step comprises the steps of:

positioning a used portion of the dye sheet in contact with said postprocessing sheet; and enabling the video printer to press the set postprocessing sheet against the image-receiving medium by pressing the used portion of the dye sheet against the image-receiving medium using the array of heater elements.

17. A video printer comprising:

drive means having an array of heater elements for receiving a video signal representing an image and driving the array of heater elements in response to the video signal;

retaining means for retaining an image-receiving medium opposed to the array of heater elements;

feeder means for feeding a dye sheet carrying a thermally transferable dye between the array of heater elements and the image-receiving medium retained by said retaining means such that said dye sheet and said image-receiving medium are in contact with each other; and a first control means for controlling said drive means, retaining means and feeder means, and enabling said drive means in response to the video signal to heat the array of heater elements, thereby transferring the dye sheet onto a surface of the image-receiving medium to record the image on the image-receiving medium; and second control means for controlling said retaining means, while retaining a flat postprocessing sheet having a primary surface on which a postprocessing surface contour is formed, to retain the surface of the image-receiving medium on which the dye has been transferred in contact with the primary surface of the postprocessing sheet, and controlling said drive means to press the postprocessing sheet via the dye sheet onto said retaining means and providing said drive means with a first signal, in place of the video signal, to heat the array of heater elements to a predetermined temperature to thereby achieve postprocessing on the image-receiving medium, the predetermined temperature exceeding a softening point of a material of an image-receiving layer of the image-receiving medium, the postprocessing sheet including a material having a softening point which is higher than the predetermined temperature.

18. A video printer in accordance with claim 17, further comprising selector means for selectively connecting said first and second control means to said drive means, retaining means and feeder means.

19. A video printer in accordance with claim 17, further comprising:

sensor means provided in connection with the array of heater elements for sensing a temperature of the array of heater elements to produce a second signal representative of the temperature sensed; and means coupled to said retaining means for generating a third signal representing a position of the image-receiving medium carried on said retaining means with respect to the array of heater elements; wherein said second control means is adapted to be operative in response to the second and third signals to provide the array of heater elements with the first signal in accordance with a pattern by which the array of heater elements is heated.

20. A video printer in accordance with claim 19, wherein said second control means further comprises:

pattern selecting means operative in response to the second and third signals for selecting a pattern of the first signal by which the array of heater elements is heated; and means interconnected to said pattern selecting means for producing the first signal in response to the selected pattern to said drive means.

21. A video printer in accordance with claim 20, wherein said pattern selecting means comprises storage means for storing data representing a pattern by which the array of heater elements is heated for developing the data in response to the second and third signals.

22. A video printer in accordance with claim 21, wherein the pattern is provided in the form of data stored in said storage means such that the array of heater elements is heated at a higher temperature when a lower temperature of the array of heater elements is sensed and at a lower temperature when a higher temperature of the array of heater elements is sensed.

23. A video printer according to claim 17, wherein said feeder means further comprises means for feeding said dye sheet in a first direction while recording the image on the image-receiving medium and in a second direction opposite said first direction so as to position a used portion of said dye sheet adjacent said postprocessing sheet in response to said second control means.

* * * * *